Patented Oct. 3, 1939

2,174,912

UNITED STATES PATENT OFFICE

2,174,912

COATED METAL WIRE

Raymond Henry Thielking, Amsterdam, N. Y., assignor to Schenectady Varnish Company, Schenectady, N. Y., a corporation of New York No Drawing. Continuation of application Serial No. 233,296, October 4, 1938. This application August 7, 1939, Serial No. 288,894

5 Claims. (Cl. 91—70)

The present invention relates to wire enamels and the product obtained by coating the same upon a wire.

Particularly, the invention is concerned with providing an insulating coating directly upon copper wire used for electrical apparatus such as motors, magnets, electric coils, commonly referred to in the trade as magnet wire. Various coatings for this purpose are now commercially available and are reasonably satisfactory. However, such coatings present disadvantages which it is the purpose of the present invention to overcome.

Ordinary wire enamels display a relatively low twist test. That is to say, conventional coated wire when subjected to twisting strains has disclosed a relatively low coefficient of adhesiveness between the coating and the metal wire. For example, ordinarily wire enamels break down when the wire has been twisted about thirty times.

It is an important object of the present invention to provide a wire coating composition having an appreciably greater adhesiveness. Coatings of the character hereinafter described when applied to copper wire have, under actual test, remained smooth and continuous, notwithstanding that the wire has been twisted approximately one hundred times.

I have discovered that vinyl resins have a marked affinity for copper wire, and that coating compositions containing such resins can be satisfactorily applied to produce a smooth continuous coat if certain critical conditions are observed. For example, the use of low boiling solvent mixtures, i. e., boiling below 212° F. is generally to be avoided, because in the enameling oven, the solvent sharply volatilizes, producing objectionable irregularities of film, and no opportunity is afforded for the coating to flow in a manner to provide a continuous coating. Furthermore, since the wire enameling bath is usually in close proximity to the heating means of the oven, a continuous and rapid volatilization of the solvent mixture takes place so that it is practically impossible to maintain the wire enamel bath at a uniform viscosity.

I employ a high boiling solvent mixture, i. e., preferably one boiling above 250° F. to successfully overcome the two objections above outlined, and in this manner, copper wire may be coated with enamels of the present invention to form a coating having a nice appearance and the required insulating and resistant properties. In other words, by the use of the high boiling mixture, the coating bath retains a substantially normal viscosity and when the wire is introduced in the oven, the volatile constituents of the solvent mixture are removed at a sufficiently slow rate as to insure that the coating may properly flow to provide complete coverage of the copper wire in a smooth continuous film.

In carrying out the invention and to illustrate a preferred example, I prepare a coating mixture having substantially the following composition:

Mixture #1

4 lbs. vinyl resin VYHH
Solvent mixture {1½ gal. methyl isobutyl ketone
{2 gal. commercial heavy coal tar naphtha The vinyl resins which I find best are among those described as "Series V" and prepared and sold by Carbide and Carbon Chemicals Corporation under their Trade-Mark "Vinylite", and having a molecular weight in excess of 10,000. I prefer, and mention as examples, vinylite resins VYHH and VYHF having a molecular weight of the order of at least 10,000 to 12,000.

These Series V resins are described as being formed by the conjoint polymerization of vinyl chloride and vinyl acetate, and that a molecule of a Series V resin may be considered to consist of nine mols of vinyl chloride and one mol of vinyl acetate. A highly polymerized resin of this series has approximately the same composition when set as a resin of a lower degree of polymerization, but more of the unit molecules are linked together to form the high polymer than in the case of the low polymer. The more highly polymerized resin therefore has a higher molecular weight and distinguishing physical properties which I find preferable.

Another coating composition including a resin of the Series "V" type is as follows:

Mixture #2

4 lbs. vinyl resin VYHF
Solvent mixture {1½ gal. methyl isobutyl ketone
{2 gal. high flash coal tar naphtha In the compositions described the resins employed are denoted as vinyl resin VYHH and VYHF, both highly polymerized, and the latter being a slightly less refined product than the VYHH type employed in the first example. Each of the resins has substantially the same properties, that of the first mixture giving a coating of slightly better appearance.

The proportions in the mixtures, above set forth, are examples of two satisfactory compositions. These proportions may be varied and different solvents and diluents may be compounded.

Other solvents which may be employed are as follows:

Acetone
Methyl ethyl ketone
Methyl n-propyl ketone
Methyl n-butyl ketone
Mesityl oxide
Methyl n-amyl ketone
Di-isobutyl ketone
Methyl n-hexyl ketone
Cyclohexanone
Methyl cyclohexanone
Isophrone
Acetonyl acetone
Ethyl acetate
Butyl acetate.

Other diluents which may be employed are as follows:

Toluene
Xylene
Solvesso #2
Solvesso #3
Troluoil (petroleum naphtha)
Tetralin
Mono chlor toluene The compositions above described, it will be noted, include a solvent mixture comprising a resin solvent in the form of a ketone and a diluent such as heavy coal tar naphtha. The solvent and diluent are so combined with relation to the amount of resin as to form a coating composition which, under temperatures of about 500° F., will flow in a manner to form a smooth continuous coating. It is important that the composition have this property since if a highly volatile solvent mixture be used, it volatilizes too quickly to assure satisfactory flow of the coating and there results a discontinuous uneven coating.

It is preferred to use in the solvent mixture both a high boiling solvent and a high boiling diluent, first, to promote flowability in the enameling oven, and, second, to avoid such rapid volatilization from the bath as to increase the viscosity thereof to a point where it is unsatisfactory for coating.

Of course, a low boiling solvent might be employed as a part of the mixture together with a high boiling diluent or vice versa, but this is not preferred because of the tendency of the low boiling constituent to volatilize and thicken the coating whence it will be impractical to run the wire through the bath.

In the above examples, the resin is present in amount of about 14%, and I have further discovered that high concentrations of the resin may be used for coating purposes in the high boiling solvent mixture, e. g., from about 14 to about 18% which is conducive to a better film and which is a marked improvement over compositions now available or which have been suggested. That is to say, a greater length of wire may be covered using a smaller amount of resin bath.

The coating compositions exemplified by the above examples are, as stated, useful in the electrical arts, particularly electrical coils. An outstanding example of the utility of the present invention is in the coils of motors employed in electrical refrigeration. For example, such motors are subjected to the corrosive influences of refrigerants, such as methyl chloride. In many instances heretofore it has been necessary to provide the wire used in coils of motors for refrigerators with cotton thread insulation only. Aside from the expense of such an insulating covering, it is not reliable and does not have anywhere near the life of the coating provided by this invention which may be sealed in with the unit without fear that the coating will be attacked and the insulation destroyed.

A further characteristic of copper wire enameled in accordance with the present invention is the permanency and flexibility of the coat. Whereas ordinary enamel gradually loses its life with age and then becomes brittle, substantially reducing its value, enamels made with my compositions have no apparent limit to their life. They retain flexibility indefinitely and when baked to suitable hardness comparable with ordinary enamels, the flexibility far surpasses the conventional products. Tests have revealed that the quality of flexibility remains undiminished even after aging in an oven at 100° C. for a period of five to six months under which treatment ordinary enamel becomes so brittle that at the slightest movement of the wire it will crack and flake.

In addition to the above important advances marked by this invention, and, as distinguished from prior methods of operation, the highly adhesive coating can be permanently applied to the wire at baking temperatures substantially below 800° F. which is that normally required with conventional wire coating compositions. That is to say, a hard resistant coating of required smoothness may be formed in accordance with the present invention by subjecting the coated wire in the enameling oven to temperatures of about 500° F., and in some cases a lower temperature. This saving in fuel has been found to apply with the various wire enameling machinery now in use.

As well known, considerable difficulty is encountered in wire coating operations due to the presence of fumes, and the composition of the present invention is of a character such that no poisonous gases are given off which might injure the health of the workman.

In all wire enameling operations, in view of the almost universal use of copper wire, economy is of extreme importance. In accordance with the present invention by reason of the low cost of the coating compositions and the saving in fuel and the ease with which the wire may be coated, e. g., it is possible to maintain the bath of uniform consistency, very substantial savings in cost are effected. Furthermore, the coating composition may be readily modified to change the properties of the coating, and such changes may be accomplished in many instances at an even greater saving or with but slight increase in expense.

Vinyl resins have been heretofore suggested as possessing insulating qualities, but up to the present time there has been no recognition of the fact that copper wire used for motors and other electrical appliances could be successfully provided with a permanent, resistant, insulating coat of a vinyl resin composition. The present composition is to be distinguished from so-called poly vinyl acetal resin coatings which involve a condensation reaction with an aldehyde. That is to say, the resins employed in manufacturing a wire coating in accordance with this invention are formed by polymerization of a vinyl compound and preferably by the conjoint polymerization of vinyl chloride and vinyl acetate.

Copper wire coated, as described herein, is provided with a coating which is hard, permanently flexible and free of brittleness, strongly adhered to the wire, resistant to oils, greases, alcohol, water, acids, alkalies, as above mentioned, and corrosive gases, non-softening at elevated temperatures, e. g., 100° C. or higher and unaffected by reduced or freezing temperatures, of high tensile strength and elasticity. Such coating forms a permanent, smooth, continuous, insulative film free of porosity and of uniform thickness on the wire.

While I have referred herein to a solvent mixture, it is to be understood that a solvent alone, preferably a high boiling solvent may be used and a diluent omitted. This is not preferred because of the fact that the use of sufficient solvent would substantially increase the expense over a solvent mixture as described above. By solvent mixture in the appended claims, I mean, therefore, either a solvent per se or a mixture of solvent and diluent.

This application is a continuation of my allowed application Serial No. 233,296, filed October 4, 1938.

I claim:

1. Copper wire having a smooth, continuous, flexible coating adhered thereto comprising the conjoint polymerization product of vinyl chloride and vinyl acetate polymerization to a molecular weight above 10,000.

2. Copper wire having a smooth, continuous, flexible coating adhered thereto comprising the conjoint polymerization product of vinyl chloride and vinyl acetate polymerized to a molecular weight of at least approximately 10,000 to 12,000.

3. Copper wire having a smooth, continuous, flexible coating of a polyvinyl resin which is the conjoint polymerization product of vinyl chloride and vinyl acetate polymerized to a molecular weight of at least approximately 10,000, said coating retaining continuity when the wire is twisted up to approximately 100 times and being substantially non-softening up to temperatures of 100 degrees centigrade.

4. Copper wire having a smooth, continuous, flexible coating of a polyvinyl resin which is the conjoint polymerization product of vinyl chloride and vinyl acetate, said product being polymerized to an extent to be inherently non-softening at temperatures of 100 degrees centigrade and having a molecular weight of at least approximately 10,000.

5. Copper magnet wire having a smooth, continuous, flexible coating adhered thereto comprising the conjoint polymerization products of vinyl chloride and vinyl acetate polymerized to a molecular weight of at least approximately 10,000.

RAYMOND HENRY THIELKING.